United States Patent
Freely et al.

(10) Patent No.: US 12,149,154 B2
(45) Date of Patent: Nov. 19, 2024

(54) ELECTRIC MACHINE HAVING A HYBRID INSULATIVE-CONDUCTIVE MANIFOLD

(71) Applicant: General Electric Company, Schenectady, NY (US)

(72) Inventors: Brendan Michael Freely, Loveland, OH (US); Pablo Gabriel Piazza Galarza, Cincinnati, OH (US); Fabian Isaza, Cincinnati, OH (US); Paul Robert Gemin, Cincinnati, OH (US); Darek Tomasz Zatorski, Fort Wright, KY (US); John Russell Yagielski, Scotia, NY (US); Andrew Michael Watson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 199 days.

(21) Appl. No.: 17/382,722

(22) Filed: Jul. 22, 2021

(65) Prior Publication Data

US 2023/0024956 A1 Jan. 26, 2023

(51) Int. Cl.
*H02K 9/197* (2006.01)
*H02K 1/20* (2006.01)
(Continued)

(52) U.S. Cl.
CPC ............... *H02K 9/197* (2013.01); *H02K 1/20* (2013.01); *H02K 3/24* (2013.01); *H02K 7/183* (2013.01)

(58) Field of Classification Search
CPC ............ H02K 9/197; H02K 1/20; H02K 3/24; H02K 7/183; H02K 3/22; H02K 9/19
See application file for complete search history.

(56) References Cited

U.S. PATENT DOCUMENTS

| | | |
|---|---|---|
| 1,362,380 A | 12/1920 | Woolson |
| 1,936,737 A | 11/1933 | Tingley |

(Continued)

FOREIGN PATENT DOCUMENTS

| | | |
|---|---|---|
| CN | 110649747 A | 1/2020 |
| DE | 102014102632 | 9/2014 |

(Continued)

OTHER PUBLICATIONS

Boeing Researches Alternative Propulsion and Fuel Options, Aviation Week & Space Technology, Jun. 4, 2012, 5 Pages. http://aviationweek.com/awin/boeing-research-alternative-propulsion-and-fuel-options.

(Continued)

*Primary Examiner* — Tulsidas C Patel
*Assistant Examiner* — Joshua Kiel M Rodriguez
(74) *Attorney, Agent, or Firm* — Dority & Manning, P.A.

(57) ABSTRACT

An electric machine having a hybrid insulative-conductive manifold is disclosed. In one aspect, an electric machine includes a manifold that includes an insulative plate and a conductive backplate positioned adjacent to the insulative plate. The insulative plate and the backplate define a first channel and a second channel therebetween. The electric machine also includes a prime winding and a secondary winding electrically isolated from the prime winding. The prime winding and the secondary winding are both in fluid communication with the first channel and the second channel. A terminal conductor extends through the backplate and insulative plate and is electrically coupled with the prime winding. The terminal conductor is electrically isolated from the backplate and provides cooling fluid to the prime winding and the first channel so that cooling fluid flows between the terminal conductor and the prime winding and between the terminal conductor and the first channel.

18 Claims, 4 Drawing Sheets

(51) Int. Cl.
  *H02K 3/24* (2006.01)
  *H02K 7/18* (2006.01)

(56) References Cited

U.S. PATENT DOCUMENTS

| | | | |
|---|---|---|---|
| 2,039,199 A | 4/1936 | Swendsen |
| 2,429,061 A | 10/1947 | Hunter |
| 2,446,999 A | 8/1948 | Camilli |
| 2,812,912 A | 11/1957 | Stevens et al. |
| 2,837,671 A | 6/1958 | Reardon et al. |
| 3,208,217 A | 9/1965 | Sonder |
| 3,286,470 A | 11/1966 | Gerlaugh |
| 3,312,448 A | 4/1967 | Hull, Jr. et al. |
| 3,332,242 A | 7/1967 | Douglas |
| 3,478,421 A | 11/1969 | Preece |
| 3,485,442 A | 12/1969 | Anderson et al. |
| 3,688,505 A | 9/1972 | Dison |
| 3,844,110 A | 10/1974 | Widlansky et al. |
| 4,089,493 A | 5/1978 | Paulson |
| 4,187,441 A | 2/1980 | Oney |
| 4,324,996 A | 4/1982 | Adelski et al. |
| 4,356,147 A | 10/1982 | Borrman et al. |
| 4,370,560 A | 1/1983 | Faulkner et al. |
| 4,433,261 A | 2/1984 | Nashiki et al. |
| 4,433,473 A | 2/1984 | Benedetti |
| 4,605,185 A | 8/1986 | Reyes |
| 4,634,191 A | 1/1987 | Studer |
| 4,674,716 A | 6/1987 | Moore |
| 4,860,537 A | 8/1989 | Taylor |
| 4,909,031 A | 3/1990 | Grieb |
| 4,913,380 A | 4/1990 | Verdaman et al. |
| 5,115,173 A | 5/1992 | Kobayashi et al. |
| 5,125,597 A | 6/1992 | Coffinberry |
| 5,174,109 A | 12/1992 | Lampe |
| 5,183,222 A | 2/1993 | Ramsey, Jr. |
| 5,188,002 A | 2/1993 | Wolf et al. |
| 5,269,135 A | 12/1993 | Vermejan et al. |
| 5,285,123 A | 2/1994 | Kataoka et al. |
| 5,300,845 A | 4/1994 | Fanning et al. |
| 5,793,137 A | 8/1998 | Smith |
| 5,799,484 A | 9/1998 | Nims |
| 5,925,961 A | 7/1999 | Sugiyanma |
| 5,927,644 A | 7/1999 | Ellis et al. |
| 5,931,052 A | 8/1999 | Zhao et al. |
| 6,062,104 A | 5/2000 | Allport |
| 6,092,360 A | 7/2000 | Hoag et al. |
| 6,105,697 A | 8/2000 | Weaver |
| 6,128,896 A | 10/2000 | Saiz |
| 6,169,332 B1 | 1/2001 | Taylor et al. |
| 6,225,724 B1 | 5/2001 | Toide et al. |
| 6,545,373 B1 | 4/2003 | Andres et al. |
| 6,583,528 B2 | 6/2003 | Gabrys |
| 6,651,929 B2 | 11/2003 | Dionne |
| 6,675,759 B2 | 1/2004 | Johnson et al. |
| 6,732,502 B2 | 5/2004 | Seda et al. |
| 6,769,874 B2 | 8/2004 | Arel |
| 6,834,831 B2 | 12/2004 | Daggett |
| 6,856,051 B2 | 2/2005 | Reiter, Jr. et al. |
| 6,888,270 B2 | 5/2005 | Reiter, Jr. et al. |
| 6,940,200 B2 | 9/2005 | Lopatinsky et al. |
| 6,966,174 B2 | 11/2005 | Paul |
| 6,976,655 B2 | 12/2005 | Thompson |
| 6,992,403 B1 | 1/2006 | Raad |
| 7,000,404 B2 | 2/2006 | Palmisano et al. |
| 7,251,942 B2 | 8/2007 | Dittmar et al. |
| 7,267,300 B2 | 9/2007 | Heath et al. |
| 7,285,871 B2 | 10/2007 | Derouineau |
| 7,291,936 B1 | 11/2007 | Robson |
| 7,380,749 B2 | 6/2008 | Fucke et al. |
| 7,387,189 B2 | 6/2008 | James et al. |
| 7,398,641 B2 | 7/2008 | Stretton et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,521,832 B2 | 4/2009 | Tajima et al. |
| 7,528,499 B2 | 5/2009 | Suttie |
| 7,583,063 B2 * | 9/2009 | Dooley ............... H02K 3/28 290/52 |
| 7,619,331 B2 | 11/2009 | Bouiller et al. |
| 7,665,689 B2 | 2/2010 | McComb |
| 7,677,502 B2 | 3/2010 | Lawson et al. |
| 7,685,828 B2 | 3/2010 | Foucault et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,832,193 B2 | 11/2010 | Orlando et al. |
| 7,841,163 B2 | 11/2010 | Welch et al. |
| 7,855,483 B2 | 12/2010 | Bouiller et al. |
| 7,905,449 B2 | 3/2011 | Cazals et al. |
| 7,937,927 B2 | 5/2011 | Suciu et al. |
| 7,942,646 B2 | 5/2011 | Zhou et al. |
| 7,946,403 B2 | 5/2011 | Burke et al. |
| 7,952,244 B2 | 5/2011 | Colin |
| 7,958,727 B2 | 6/2011 | Arnold |
| 7,966,833 B2 | 6/2011 | Beutin et al. |
| 7,970,497 B2 | 6/2011 | Derouineau et al. |
| 7,971,499 B2 | 7/2011 | Herlihy et al. |
| 7,976,273 B2 | 7/2011 | Suciu et al. |
| 8,016,228 B2 | 9/2011 | Fucke et al. |
| 8,026,624 B2 | 9/2011 | Beutin et al. |
| 8,033,094 B2 | 10/2011 | Suciu et al. |
| 8,039,983 B2 | 10/2011 | Cote et al. |
| 8,074,777 B2 | 12/2011 | Birdi et al. |
| 8,093,747 B2 | 1/2012 | Pearson et al. |
| 8,099,944 B2 | 1/2012 | Foster et al. |
| 8,109,073 B2 | 2/2012 | Foster et al. |
| 8,113,005 B2 | 2/2012 | Gotz et al. |
| 8,128,019 B2 | 3/2012 | Annati et al. |
| 8,129,874 B2 | 3/2012 | Lambka et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,291,716 B2 | 10/2012 | Foster et al. |
| 8,294,404 B2 | 10/2012 | Stiesdal et al. |
| 8,314,505 B2 | 11/2012 | McLoughlin et al. |
| 8,317,126 B2 | 11/2012 | Harris et al. |
| 8,324,746 B2 | 12/2012 | Bradbrook |
| 8,350,398 B2 | 1/2013 | Butt |
| 8,362,731 B2 | 1/2013 | Smith et al. |
| 8,375,695 B2 | 2/2013 | Schilling et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,499,544 B2 | 8/2013 | Shafer et al. |
| 8,522,522 B2 | 9/2013 | Poisson |
| 8,536,752 B2 | 9/2013 | Katsumata et al. |
| 8,549,833 B2 | 10/2013 | Hyde et al. |
| 8,552,575 B2 | 10/2013 | Teets et al. |
| 8,568,938 B2 | 10/2013 | Gao et al. |
| 8,596,036 B2 | 12/2013 | Hyde et al. |
| 8,598,725 B1 | 12/2013 | Himmelmann |
| 8,631,657 B2 | 1/2014 | Hagen et al. |
| 8,640,439 B2 | 2/2014 | Hoffjann et al. |
| 8,657,227 B1 | 2/2014 | Bayliss et al. |
| 8,661,781 B2 | 3/2014 | Moore et al. |
| 8,672,263 B2 | 3/2014 | Stolte |
| 8,684,304 B2 | 4/2014 | Burns et al. |
| 8,689,538 B2 | 4/2014 | Sankrithi et al. |
| 8,692,489 B2 | 4/2014 | Maalioune |
| 8,723,349 B2 | 5/2014 | Huang et al. |
| 8,723,385 B2 | 5/2014 | Jia et al. |
| 8,742,605 B1 | 6/2014 | Wilhide et al. |
| 8,756,910 B2 | 6/2014 | Donovan et al. |
| 8,786,151 B1 | 7/2014 | Cole et al. |
| 8,836,158 B2 | 9/2014 | Cho et al. |
| 8,836,160 B1 | 9/2014 | Paterson et al. |
| 8,857,191 B2 | 10/2014 | Hyde et al. |
| 8,890,343 B2 | 11/2014 | Bulin et al. |
| 8,925,660 B2 | 1/2015 | Bowdich et al. |

(56) References Cited

U.S. PATENT DOCUMENTS

| | | |
|---|---|---|
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,967,967 B2 | 3/2015 | Stretton et al. |
| 8,970,075 B2 | 3/2015 | Rippel et al. |
| 8,997,493 B2 | 4/2015 | Brust et al. |
| 8,998,580 B2 | 4/2015 | Quiroz-Hernandez |
| 9,003,811 B2 | 4/2015 | Barnett et al. |
| 9,004,849 B2 | 4/2015 | Munsell et al. |
| 9,017,028 B2 | 4/2015 | Fabre |
| 9,024,504 B2 | 5/2015 | Nishio et al. |
| 9,038,398 B2 | 5/2015 | Suciu et al. |
| 9,045,996 B2 | 6/2015 | Anghel et al. |
| 9,059,440 B2 | 6/2015 | Hotto |
| 9,068,562 B1 | 6/2015 | Budica et al. |
| 9,091,316 B2 | 7/2015 | Paschen |
| 9,143,023 B1 | 9/2015 | Uskert |
| 9,160,208 B2 | 10/2015 | Murata et al. |
| 9,174,741 B2 | 11/2015 | Suntharalingam et al. |
| 9,190,892 B2 | 11/2015 | Anthony |
| 9,257,890 B2 | 2/2016 | Erd et al. |
| 9,359,082 B2 | 6/2016 | Mercier |
| 9,386,730 B2 | 7/2016 | Rodriguez et al. |
| 9,450,468 B2 | 9/2016 | Chamberlin et al. |
| 9,494,077 B2 | 11/2016 | Chanez et al. |
| 9,517,843 B2 | 12/2016 | Pesyna et al. |
| 9,581,233 B2 | 2/2017 | Manzoor |
| 9,611,788 B2 | 4/2017 | Sidelkovskiy |
| 9,776,714 B2 | 10/2017 | Shapery |
| 10,071,811 B2 | 9/2018 | Kupiszewski et al. |
| 10,218,232 B2 | 2/2019 | Niergarth et al. |
| 10,374,477 B2 | 8/2019 | Niergarth et al. |
| 10,487,839 B2 | 11/2019 | Kupiszewski et al. |
| 10,608,495 B2 | 3/2020 | Yagyu et al. |
| 2001/0034146 A1* | 10/2001 | Bungo .............. H01T 13/05 439/127 |
| 2005/0150970 A1 | 7/2005 | Beutin et al. |
| 2005/0284150 A1 | 12/2005 | Dittmar et al. |
| 2006/0037325 A1 | 2/2006 | Peters et al. |
| 2006/0125243 A1 | 6/2006 | Miller |
| 2006/0137355 A1 | 6/2006 | Welch et al. |
| 2006/0138779 A1 | 6/2006 | Bouiller et al. |
| 2006/0260323 A1 | 11/2006 | Moulebhar |
| 2007/0084189 A1 | 4/2007 | Moniz et al. |
| 2008/0056892 A1 | 3/2008 | Barton et al. |
| 2008/0110151 A1 | 5/2008 | Welch et al. |
| 2008/0110596 A1 | 5/2008 | Schwarz et al. |
| 2008/0134679 A1 | 6/2008 | Cavanaugh et al. |
| 2008/0143115 A1 | 6/2008 | Kern et al. |
| 2008/0148706 A1 | 6/2008 | Beauregard |
| 2009/0145998 A1 | 6/2009 | Salyer |
| 2009/0179424 A1 | 7/2009 | Yaron |
| 2009/0289516 A1 | 11/2009 | Hopewell et al. |
| 2009/0302717 A1 | 12/2009 | Hoffman |
| 2010/0038473 A1 | 2/2010 | Schneider et al. |
| 2010/0133835 A1 | 6/2010 | Dooley et al. |
| 2010/0207007 A1 | 8/2010 | Cottrell et al. |
| 2010/0219779 A1 | 9/2010 | Bradbrook |
| 2010/0247297 A1 | 9/2010 | Legare et al. |
| 2010/0329844 A1 | 12/2010 | Bradbrook |
| 2011/0016882 A1 | 1/2011 | Woelke et al. |
| 2011/0024555 A1 | 2/2011 | Kuhn, Jr. |
| 2011/0024567 A1 | 2/2011 | Blackwelder et al. |
| 2011/0273147 A1 | 11/2011 | Hall et al. |
| 2012/0025676 A1 | 2/2012 | Poisson |
| 2012/0086266 A1 | 4/2012 | Shipley et al. |
| 2012/0119020 A1 | 5/2012 | Burns et al. |
| 2012/0153076 A1 | 6/2012 | Burns et al. |
| 2012/0177493 A1 | 7/2012 | Fabre |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0062984 A1 | 3/2013 | Tremelling |
| 2013/0088019 A1 | 4/2013 | Huang et al. |
| 2013/0094963 A1 | 4/2013 | Rolt |
| 2013/0098066 A1 | 4/2013 | Gallet et al. |
| 2013/0099065 A1 | 4/2013 | Stuhlberger |
| 2013/0125561 A1 | 5/2013 | Schwarz et al. |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0277976 A1 | 10/2013 | Koenig |
| 2013/0306024 A1 | 11/2013 | Rolt |
| 2014/0010652 A1 | 1/2014 | Suntharalingam et al. |
| 2014/0035423 A1 | 2/2014 | Veronesi et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0262524 A1 | 9/2014 | Valliyappan et al. |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0360206 A1 | 12/2014 | Bradbrook |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0000252 A1 | 1/2015 | Moore et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0093272 A1 | 4/2015 | Komer et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0171721 A1 | 6/2015 | Seo et al. |
| 2015/0176481 A1 | 6/2015 | Jaeger |
| 2015/0183513 A1 | 7/2015 | Gerber |
| 2015/0183522 A1 | 7/2015 | Ouellette |
| 2015/0255838 A1 | 9/2015 | Inoue et al. |
| 2015/0256051 A1 | 9/2015 | Hippen et al. |
| 2015/0284071 A1 | 10/2015 | Veilleux, Jr. et al. |
| 2015/0314865 A1 | 11/2015 | Bermond et al. |
| 2015/0380999 A1 | 12/2015 | Joshi et al. |
| 2016/0010589 A1 | 1/2016 | Rolt |
| 2016/0016670 A1 | 1/2016 | Sautreuil et al. |
| 2016/0023773 A1 | 1/2016 | Himmelmann et al. |
| 2016/0043606 A1 | 2/2016 | Chase |
| 2016/0061053 A1 | 3/2016 | Thomassin |
| 2016/0070266 A1 | 3/2016 | DiVito et al. |
| 2016/0076446 A1 | 3/2016 | Bailey Noval et al. |
| 2016/0123182 A1 | 5/2016 | Samaritano et al. |
| 2016/0144970 A1 | 5/2016 | Van Der Merwe et al. |
| 2016/0149469 A1 | 5/2016 | Lemmers et al. |
| 2016/0214727 A1 | 7/2016 | Hamel et al. |
| 2016/0332741 A1 | 11/2016 | Moxon |
| 2016/0340051 A1 | 11/2016 | Edwards et al. |
| 2016/0348589 A1 | 12/2016 | Patel et al. |
| 2016/0355272 A1 | 12/2016 | Moxon |
| 2017/0005544 A1 | 1/2017 | Pal |
| 2017/0018978 A1 | 1/2017 | Horiuchi et al. |
| 2017/0081034 A1 | 3/2017 | Marrinan et al. |
| 2017/0096231 A1 | 4/2017 | Curlier |
| 2017/0101191 A1 | 4/2017 | Becker et al. |

(56) References Cited

U.S. PATENT DOCUMENTS

| | | |
|---|---|---|
| 2017/0214284 A1* | 7/2017 | Fries .................. H02K 3/22 |
| 2017/0226926 A1 | 8/2017 | Army et al. |
| 2017/0267370 A1 | 9/2017 | Ullyott et al. |
| 2017/0274992 A1 | 9/2017 | Chretien |
| 2017/0291693 A1 | 10/2017 | Niergarth et al. |
| 2017/0292523 A1 | 10/2017 | Niergarth et al. |
| 2017/0297727 A1 | 10/2017 | Niergarth et al. |
| 2017/0297728 A1 | 10/2017 | Niergarth et al. |
| 2018/0023483 A1 | 1/2018 | LePache et al. |
| 2018/0050806 A1 | 2/2018 | Kupiszewski et al. |
| 2018/0050807 A1 | 2/2018 | Kupiszewski et al. |
| 2018/0050810 A1 | 2/2018 | Niergarth et al. |
| 2018/0050811 A1 | 2/2018 | Niergarth et al. |
| 2018/0051701 A1 | 2/2018 | Kupiszewski et al. |
| 2018/0051702 A1 | 2/2018 | Kupiszewski et al. |
| 2018/0138766 A1 | 5/2018 | Moore et al. |
| 2018/0138767 A1 | 5/2018 | Moore et al. |
| 2019/0085714 A1 | 3/2019 | Zatorski et al. |
| 2019/0312488 A1 | 10/2019 | Latulipe et al. |

FOREIGN PATENT DOCUMENTS

| | | | |
|---|---|---|---|
| DE | 102018129230 B4 * | 2/2021 | ............... H02K 3/22 |
| EP | 2128419 A1 | 12/2009 | |
| EP | 2597269 A2 | 5/2013 | |
| EP | 2774853 A1 | 9/2014 | |
| FR | 3004699 A1 | 10/2014 | |
| GB | 1064946 A | 4/1967 | |
| GB | 1179553 A * | 1/1970 | ............... H02K 3/22 |
| GB | 2443743 A | 5/2008 | |
| GB | 2463957 A | 4/2010 | |
| GB | 2489311 A | 9/2012 | |
| WO | WO2005091468 A1 | 9/2005 | |
| WO | WO2010/020199 A1 | 2/2010 | |
| WO | WO2014/072615 A1 | 5/2014 | |
| WO | WO2014/123740 A1 | 8/2014 | |
| WO | WO2018/035206 A1 | 2/2018 | |

OTHER PUBLICATIONS

Bouferrouk et al., Innovative Methods for the Passive and Active Control of Flow and Heat Transfer for Gas Turbine Blade Cooling, FET 07, 1 Page.

Bradley et al., Subsonic Ultra Green Aircraft Research, Phase II: N+4 Advanced Concept Development, NASA/CR-2012-217556, May 2012, 148 Pages.

Mahmoudi et al., Axial-flux permanent-magnet machine modeling, design, simulation and analysis, Scientific Research and Essays, vol. 6, No. 12, Jun. 18, 2011, pp. 2525-2549. www.academicjournals.org/journal/SPE/article-full-text-pdf/A6B960823151.

Misra, Nano-Magnets and Additive Manufacturing for Electric Motors, NASA Glenn Research Center, Apr. 25, 26, 2014, Santa Rosa CA, pp. 1-21. http://ntrs.nasa.gov/archive/nasa/casi.ntrs.nasa.gov/20140010481.pdf.

Oh et al., Axial Flux Variable Gap Motor: Application in Vehicle Systems, Argonne National Laboratory, 2002-10-1088, 2002, 11 Pages. http://www.autonomie.net/docs/CIL/axial_flux_variable_gap_motor.pdf Schramm, Damping of Torsional Interaction Effects in Power Systems, 2010, pp. 1-132.

European Search Report Corresponding to Application No. 22183701 on Dec. 8, 2022.

* cited by examiner

ELECTRIC MACHINE HAVING A HYBRID INSULATIVE-CONDUCTIVE MANIFOLD

FIELD

The present subject matter relates generally to electric machines, and more particularly to electric machines having cooling systems.

BACKGROUND

Many electric machines, such as high density electric motors, include active cooling circuits to manage thermal constraints. Cooling circuits are frequently either in near proximity to or integrated with current carrying elements in the electric machine due to the nature of heat generation in these machines. Some electric machines include an inlet manifold to distribute cooling fluid to the cooling circuits and an outlet manifold to collect the cooling fluid that has passed through the cooling circuits. Conventionally, such manifolds have been made of electrically-conductive materials, such as aluminum. Electrically-conductive manifolds present certain challenges for electric machines. For instance, cooling fluid received at one of the conductive manifolds can cause a manifold to act as a common electrical point, which can lead to electrical shorting between the current carrying elements of the electric machine. Accordingly, electrical isolators are typically required to electrically isolate the cooling circuits. Electrical isolators can add weight and complexity to the electric machine and can require current carrying elements to have increased length, which can lead to electrical losses.

Therefore, an electric machine that addresses one or more of the challenges above would be useful.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
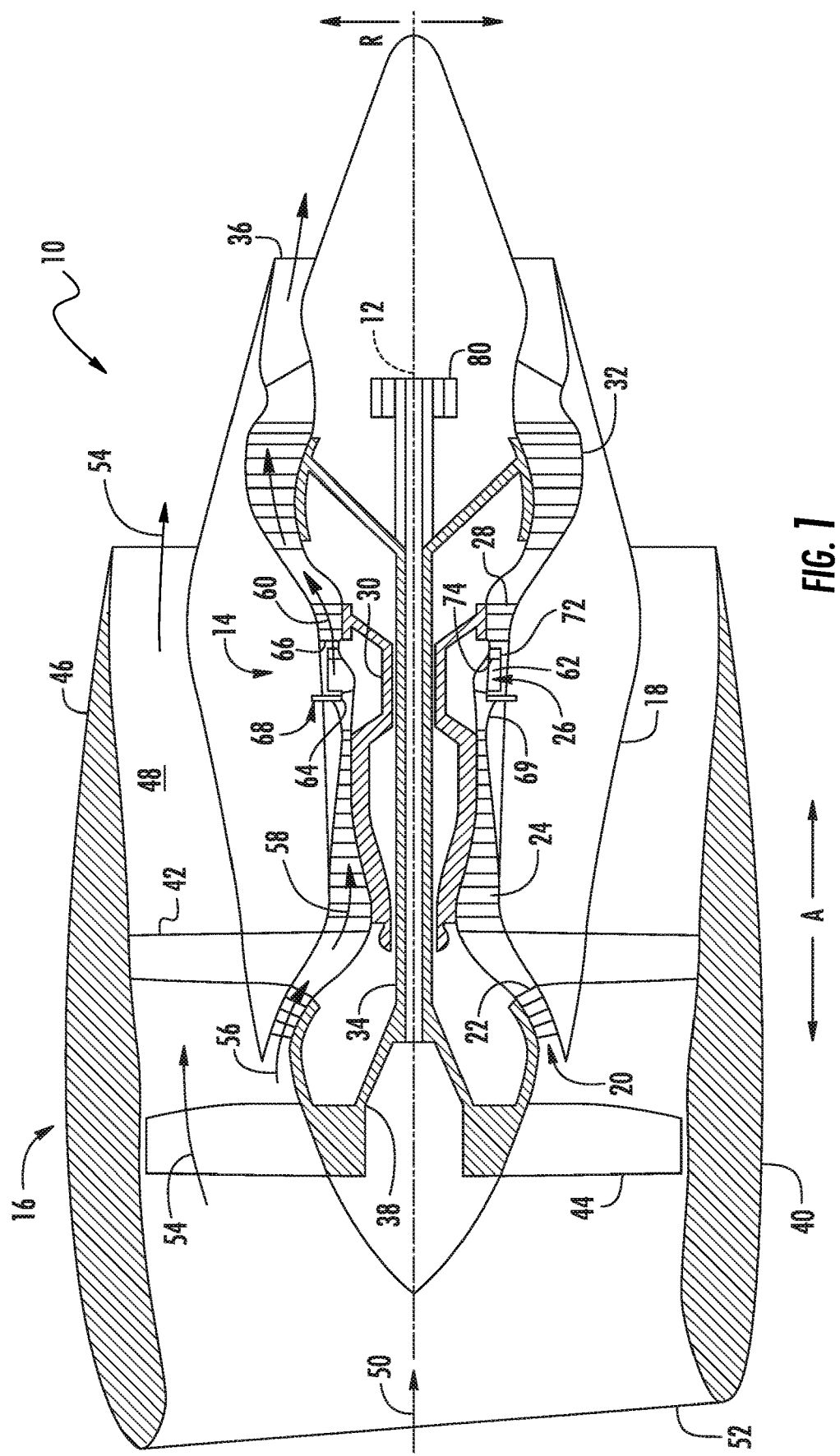
FIG. 1 provides a schematic cross-sectional view of a gas turbine engine according to various embodiments of the present disclosure.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Aspects of the present disclosure are directed to an electric machine having a cooling system. Particularly, the inventors of the present disclosure have developed an electric machine that includes a hybrid insulative-conductive manifold for distributing/collecting coolant used for cooling windings of the electric machine. The hybrid insulative-conductive manifold is constructed of both electrically insulative and electrically conductive materials; hence, the hybrid designation of the manifold. The hybrid construction of the manifold may provide a number of advantages and benefits. For instance, the hybrid construction of the manifold allows for a first winding and a second winding of the electric machine to be hydraulically coupled with one another yet electrically isolated from one another. The hybrid construction is also beneficial in that manufacturing complexity, time, and cost may be reduced.

In one example aspect, an electric machine includes a hybrid insulative-conductive manifold. The manifold includes an insulative plate and a backplate positioned adjacent to the insulative plate. The insulative plate is formed of an electrically insulative material and the backplate is formed of an electrically conductive material. The insulative plate and the backplate can physically contact one another. The insulative plate and the backplate define at least two fluidly isolated channels. The channels are fluidly isolated in that cooling fluid is prevented from passing directly from one channel to the other; rather, the cooling fluid must first pass through one or more cooling circuits. In some embodiments, the insulative plate and the backplate can define a first channel therebetween. The insulative plate and the backplate can also define a second channel therebetween. The second channel is spaced from the first channel. The first channel and the second channel are both operable to receive cooling fluid, and as noted, the first and second channel can be fluidly isolated channels.

The electric machine also includes at least one prime winding and one or more associated secondary windings. The prime and secondary windings are current-carrying members that are double as hollow cooling circuits. The prime winding and/or the secondary windings can extend through one or more end turns as will be appreciated. The secondary windings are in fluid communication with the first channel and the second channel. The electric machine also includes a terminal conductor that functions as both the electrical connection point or terminal of the electric machine and as the interface for cooling fluid to either enter or exit the electric machine. The terminal conductor is formed of an electrically conductive material and extends through the backplate and insulative plate. The terminal conductor is electrically coupled or connected with the prime winding. The terminal conductor is electrically isolated from the backplate. Particularly, an outboard terminal sleeve formed of an electrically insulative material can be disposed between the terminal conductor and the backplate to electrically isolate them from one another. Moreover, an inboard terminal sleeve can be disposed between the terminal conductor and the insulative plate to physically separate them. These sleeves electrically separate the terminal conductor from other electrically conducting components.

Further, the terminal conductor is in fluid communication with the prime winding and with the first channel. In this manner, cooling fluid can flow between the terminal conductor and the prime winding and between the terminal conductor and the first channel. For instance, when cooling fluid is provided to the electric machine via the terminal conductor, a first portion of the cooling fluid can flow into the first channel, e.g., through one or more openings defined by the terminal conductor. The cooling fluid flowing along the first channel can flow into the hollow secondary windings, and in some embodiments, into other windings of the electric machine. In this regard, cooling fluid flowing along the first channel is distributed to the hollow windings of the electric machine to provide cooling thereto. Moreover, a second portion of the cooling fluid can flow into the prime winding electrically connected to the terminal conductor to provide cooling thereto.

The cooling fluid can flow through the hollow prime and secondary windings wound through one or more end turns and can be returned to the second channel. Winding sleeves can be disposed between each winding or winding connectors thereof so that the windings are not in physical contact with the insulative plate. The cooling fluid collected in the second channel can exit the second channel and the electric machine through an outlet port in fluid communication with the second channel. The cooling fluid can exit through the outlet port and can be cooled, e.g., by one or more heat exchangers, before being circulated back to the first channel.

As noted above, an electric machine equipped with a hybrid insulative-conductive manifold has a number of advantages and benefits. Advantageously, the non-electrically conductive or insulative components of the manifold electrically decouple or isolate the windings of the electric machine despite the windings being hydraulically or fluidly coupled with one another via the manifold. Stated another way, the manifold allows for electrical independence or isolation of all cooling circuits connected to a given manifold. That is, the manifold provided herein allows for the distribution and collection of cooling fluid (e.g., oil) between current-carrying elements that are integrated directly with the cooling circuits without electrically tying the current-carrying elements together. In addition, the manifold disclosed herein may provide an improved form-factor and weight reduction at least in part due to the strategic arrangement of the non-electrically conductive or insulative components of the manifold. The strategic arrangement of the insulative components of the manifold also allows for use of an electrically conductive backplate, which may be easy to manufacture and machine as necessary.

Further, the manifold disclosed herein may provide an improved package safety due to the minimization of the "live" electrically conductive areas of the electric machine and its associated cooling system. In addition, the manifold disclosed herein may reduce the electrical loss and heat generated due to decreased conduction path length of the windings. This is so as the need to provide electrical isolators is eliminated or greatly reduced due to the manifold being formed of a non-electrically conductive material. The electric machine can be implemented in any suitable application, such as aviation applications.

FIG. 1 provides a schematic cross-sectional view of an exemplary turbomachine as may incorporate various embodiments of the present disclosure. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends along the axial direction A for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a core gas turbine engine 14 and a fan section 16 positioned upstream thereof. The core engine 14 includes a tubular engine cowl 18 that defines an annular core inlet 20. The engine cowl 18 further encloses and supports a booster or low pressure compressor 22 for pressurizing the air that enters core engine 14 through core inlet 20. A high pressure, multi-stage, axial-flow compressor 24 receives pressurized air from the LP compressor 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 downstream to a high pressure turbine 28 for driving the high pressure compressor 24 through a high pressure shaft 30 or a second rotatable component. The high energy combustion products then flow to a low pressure turbine 32 for driving the LP compressor 22 and the fan section 16 through a low pressure shaft 34 or a first rotatable component. The LP shaft 34 is coaxial with the HP shaft 30 in this example embodiment. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by an annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. A downstream section 46 of the fan casing 40 extends over an outer portion of the core engine 14 to define a bypass passage 48. Air that passes through the bypass passage 48 provides propulsive thrust as will be explained further below. In some alternative embodiments, the LP shaft 34 may be connected to the fan rotor 38 via a speed reduction device, such as a reduction gear gearbox in an indirect-drive or geared-drive configuration. Such speed reduction devices can be included between any suitable shafts/spools within the turbofan 10 as desired or required.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the LP compressor 22 through the core inlet 20.

The pressure of the second airflow 56 is progressively increased by the LP compressor 22 and then enters the HP compressor 24, as represented by arrow 58. The discharged pressurized air stream flows downstream to the combustor 26 where fuel is introduced to generate combustion gases or products. The combustion products 60 exit the combustor 26 and flow through the HP turbine 28. The combustion products 60 then flow through the LP turbine 32 and exit the exhaust nozzle 36 to produce thrust. Moreover, as noted above, a portion of the incoming airflow 50 flows through the bypass passage 48 and through an exit nozzle defined between the fan casing 40 and the engine cowl 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction A toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the HP turbine 28. For this embodiment, the HP turbine 28 rotates the HP compressor 24 via the HP shaft 30 and the LP turbine 32 drives the LP compressor 22 and the fan rotor 38 via the LP shaft 34.

Notably, for this embodiment, the turbofan 10 is an aeronautical electric hybrid propulsion machine. Particularly, turbofan 10 includes one or more electric machines operably coupled with rotary components thereof. For the depicted embodiment of FIG. 1, the turbofan 10 includes an electric machine 80 operatively coupled with the LP shaft 34. Although the electric machine 80 is operatively coupled with the LP shaft 34 at an aft end of the LP shaft 34, the electric machine 80 can be mounted to the LP shaft 34 at any suitable location. In some embodiments, the electric machine 80 can be an electric motor operable to drive or motor the LP shaft 34, e.g., during an engine burst. In other embodiments, the electric machine 80 can be an electric generator operable to convert mechanical energy into electrical energy. In this way, electrical power generated by the electric machine 80 can be directed to various engine and/or aircraft systems. In some embodiments, the electric machine 80 can function as a motor/generator with dual functionality. In some embodiments, one or more electric machines can be operatively coupled with the HP shaft 30 and can be motors, generators, and/or combination motor/generators. In other embodiments, one or more electric machines can be operatively coupled with other rotary components of the turbofan 10 and can be motors, generators, and/or combination motor/generators.

Although turbofan 10 has been described and illustrated in FIG. 1 as representing an example hybrid turbomachine, the subject matter of the present disclosure may apply to or be incorporated with other suitable types of multi-spool turbomachines. For instance, the subject matter of the present disclosure may apply to or be incorporated with other suitable turbine engines, such as steam and other gas turbine engines. Example gas turbine engines may include, without limitation, turbojets, turboprop, turboshaft, aeroderivatives, auxiliary power units, etc. Further, the electric machines and features thereof described in the present disclosure may be applied to or incorporated in other suitable applications outside of aviation applications. Indeed, the electric machines and inventive features described herein can be applied to or incorporated into any suitable application or industry in which an electric machine with cooling features is applicable.

Figure 2:
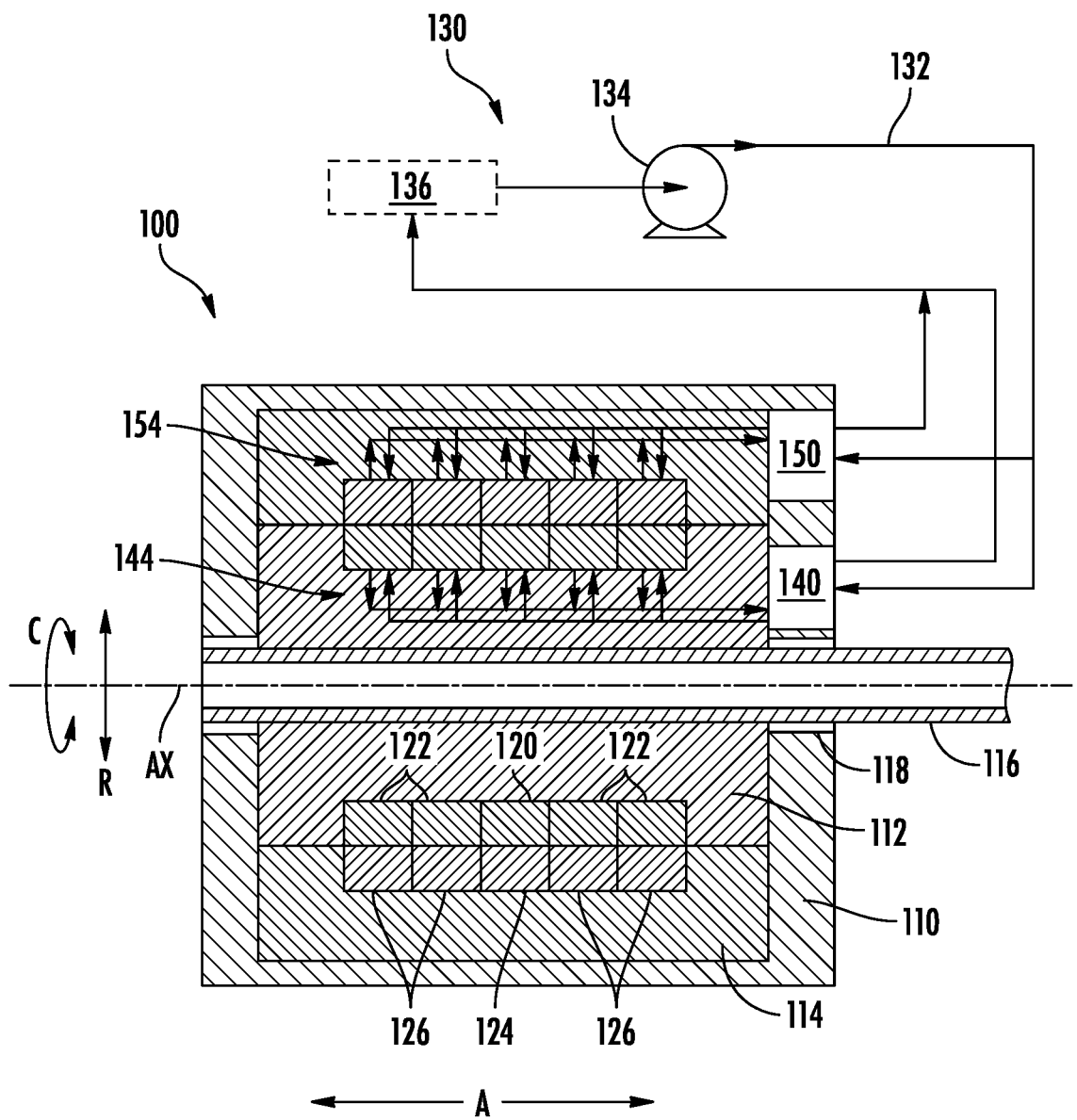
FIG. 2 provides a schematic view of an electric machine according to an example embodiment of the present disclosure.

FIG. 2 provides a schematic view of an electric machine 100 according to an example embodiment of the present disclosure. For reference, the electric machine 100 defines an axial direction A, a radial direction R, and a circumferential direction C. As depicted, the electric machine 100 includes a casing 110 or housing. The electric machine 100 also includes a rotor 112 and a stator 114 encased within the casing 110. The rotor 112 is operatively coupled with a shaft 116. The shaft 116 can be supported by the casing 110 via one or more bearings 118. The shaft 116 can be any suitable shaft, e.g., a drive shaft, a low pressure or a high pressure shaft of an aviation gas turbine engine (FIG. 1), etc. The shaft 116 is rotatable about an axis of rotation AX. The rotor 112 is rotatable in unison with the shaft 116 about the axis of rotation AX. The stator 114 is fixed relative to the rotor 112 and the shaft 116.

For this embodiment, the rotor 112 and the stator 114 each include a plurality of current carrying elements, e.g., windings or coils. Particularly, the rotor 112 includes a prime winding 120 and one or more one or more secondary windings 122 in electrical communication with the prime winding 120. The one or more secondary windings 122 can be electrically connected to the prime winding 120 in series. Notably, the rotor 112 of the electric machine 100 includes at least one prime winding and one or more associated secondary windings in electrical communication with the at least one prime winding. In the depicted embodiment of FIG. 2, for instance, the rotor 112 of the electric machine 100 includes a single prime winding and four associated secondary windings. In some embodiments, the rotor 112 can include a plurality of prime windings each having associated one or more secondary windings.

For instance, in one example embodiment, the electric machine 100 can be a three-phase electric machine. In such an embodiment, the electric machine 100 can include a first prime winding and one or more secondary windings associated therewith, a second prime winding and one or more secondary windings associated therewith, and a third prime winding and one or more secondary windings associated therewith. In another example embodiment, the electric machine 100 can be a six-phase electric machine. In such an embodiment, the electric machine 100 can include a first, second, third, fourth, fifth, and six prime winding. Each of the six prime windings can include one or more secondary windings associated with their respective prime windings.

Like the rotor 112, the stator 114 includes at least one prime winding and one or more secondary windings associated with the at least one prime winding. As depicted in FIG. 2, the stator 114 includes a prime winding 124 and one or more one or more secondary windings 126 associated with the prime winding 124. For this embodiment, the stator 114 of the electric machine 100 includes a single prime winding and four associated secondary windings.

In some embodiments, the rotor 112 can include a plurality of prime windings each having associated one or more secondary windings. For instance, as one example, in embodiments in which the electric machine 100 is a three-phase electric machine, the stator 114 can have three prime windings each having associated one or more secondary windings. As another example, in embodiments in which the electric machine 100 is a six-phase electric machine, the stator 114 can have six prime windings each having associated one or more secondary windings.

As will be appreciated, when the electric machine 100 functions as a generator, the movement of the coils or windings 120, 122 of the rotor 112 relative to the coils or windings 124, 126 of the stator 114 causes electrical power to be generated. When the electric machine 100 functions as a motor, the movement of the coils or windings 120, 122 of the rotor 112 relative to the coils or windings 124, 126 of the stator 114 causes an applied torque or force on the shaft 116, thereby causing the shaft 116 to rotate about its axis of rotation AX.

As further shown in FIG. 2, the electric machine 100 includes a cooling system 130, which is shown schematically. Generally, the cooling system 130 is operable to cool the windings of the electric machine 100. The cooling system 130 of the electric machine 100 includes a cooling loop 132 along which a coolant or cooling fluid flows. The cooling fluid can be any suitable dielectric fluid or fluid with high electrical resistivity. As one example, the cooling fluid can be oil. Moreover, for this embodiment, the cooling loop 132 is a closed loop, and thus, the cooling system 130 of the electric machine 100 is a sealed system. A pump 134 is positioned along the cooling loop 132 to move cooling fluid along the cooling loop 132. In some embodiments, more than one pump can be positioned along the cooling loop 132.

A stator manifold 150 is positioned along the cooling loop 132. Notably, for this embodiment, the stator manifold 150 is a hybrid insulative-conductive manifold. The stator manifold 150 is a hybrid insulative-conductive manifold in that it includes both electrically insulative components as well as electrically conductive components. As will be explained herein, the electrically conductive and insulative components of the stator manifold 150 are strategically arranged so that insulative components decouple or isolate the windings of the electric machine 100 despite each winding receiving cooling fluid provided or collected at the manifold 150, among other benefits.

As depicted in FIG. 2, the stator manifold 150 provides an interface between the windings 124, 126 of the electric machine 100 and the remainder of cooling system 130. The stator manifold 150 defines both an inlet and an outlet for cooling fluid to flow into and out of the electric machine 100. Particularly, cooling fluid flowing downstream of the pump 134 is received by the stator manifold 150 and the stator manifold 150 distributes the cooling fluid to a plurality of cooling circuits 154 that cool the windings 124, 126 of the stator 114. For this embodiment, the cooling circuits 154 are integrated with the windings 124, 126. Particularly, the windings 124, 126 are hollow and cooling fluid is directed through the hollow windings to provide cooling thereto. The cooling fluid exits the cooling circuits 154 and is collected by the stator manifold 150.

For this embodiment, a rotor manifold 140 is positioned along the cooling loop 132. Like the stator manifold 150, the rotor manifold 140 is a hybrid insulative-conductive manifold. As shown, cooling fluid flowing downstream of the pump 134 is received by the rotor manifold 140 and the rotor manifold 140 distributes the cooling fluid to a plurality of cooling circuits 144 that cool the windings 120, 122 of the rotor 112. For this example embodiment, the cooling circuits 144 are integrated with the windings 120, 122. Particularly, the windings 120, 122 are hollow and cooling fluid is directed through the hollow windings to provide cooling thereto. The cooling fluid exits the cooling circuits 144 and is collected by the rotor manifold 140.

Optionally, the cooling fluid exiting the stator manifold 150 and the rotor manifold 140 can pass through one or more heat exchangers positioned along the cooling loop 132, such as heat exchanger 136. In this way, the cooling fluid can be cooled prior to being recirculated with the cooling circuits 144, 154. The heat exchanger 136 can be any suitable type of heat exchanger 136, such as an air-cooled heat exchanger or a liquid-cooled heat exchanger.

Although the electric machine 100 has been described and illustrated in FIG. 2 as having a particular configuration, it will be appreciated that the inventive aspects of the present disclosure may apply to electric machines having alternative configurations or cooling systems. Further, the stator 114 and/or rotor 112 may have different configurations or may be arranged in a different manner than illustrated in FIG. 2.

Figure 3:
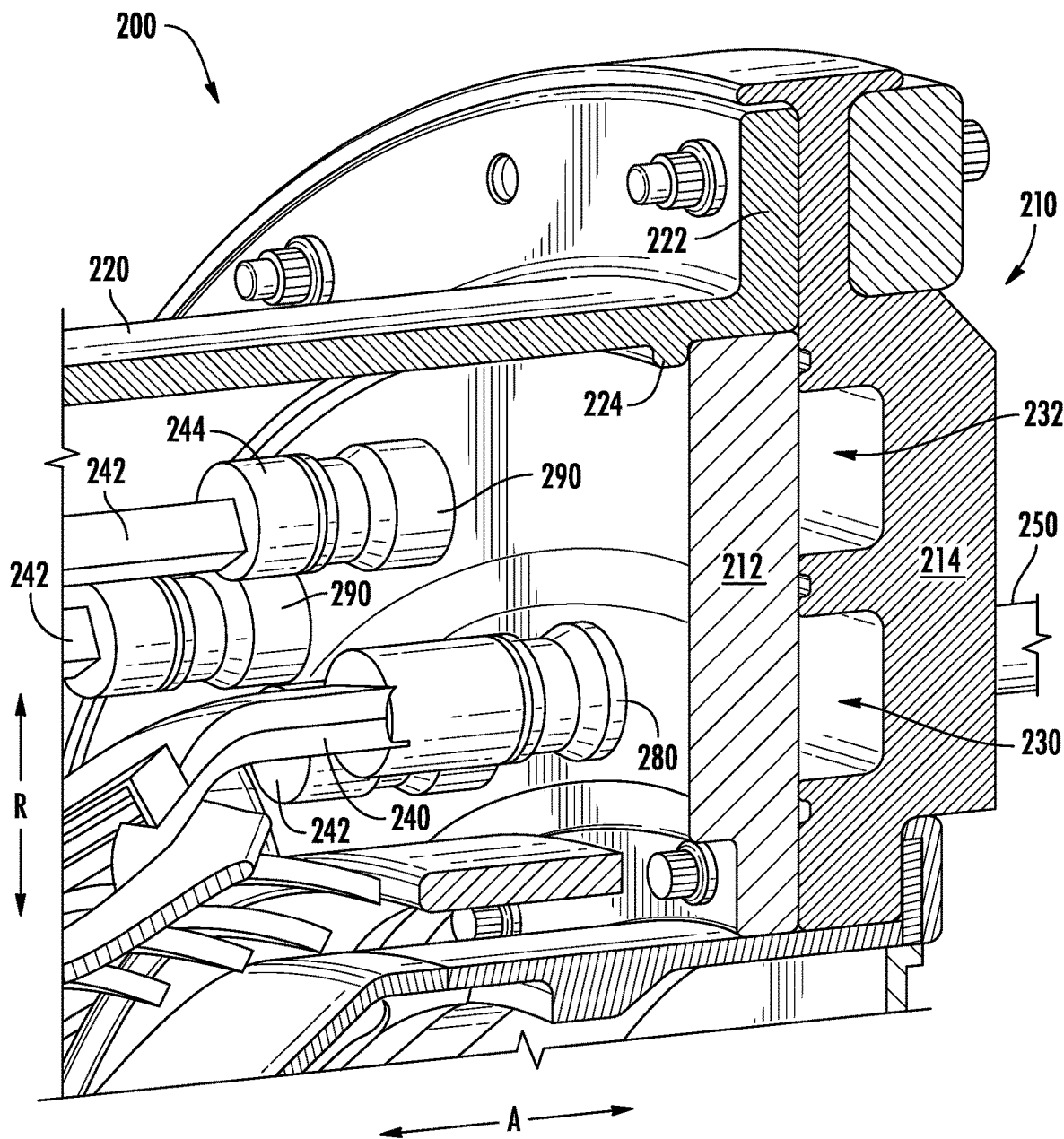
FIG. 3 provides a perspective cross-sectional view of a part of a manifold of an electric machine according to one example embodiment of the present disclosure.
Figure 4:
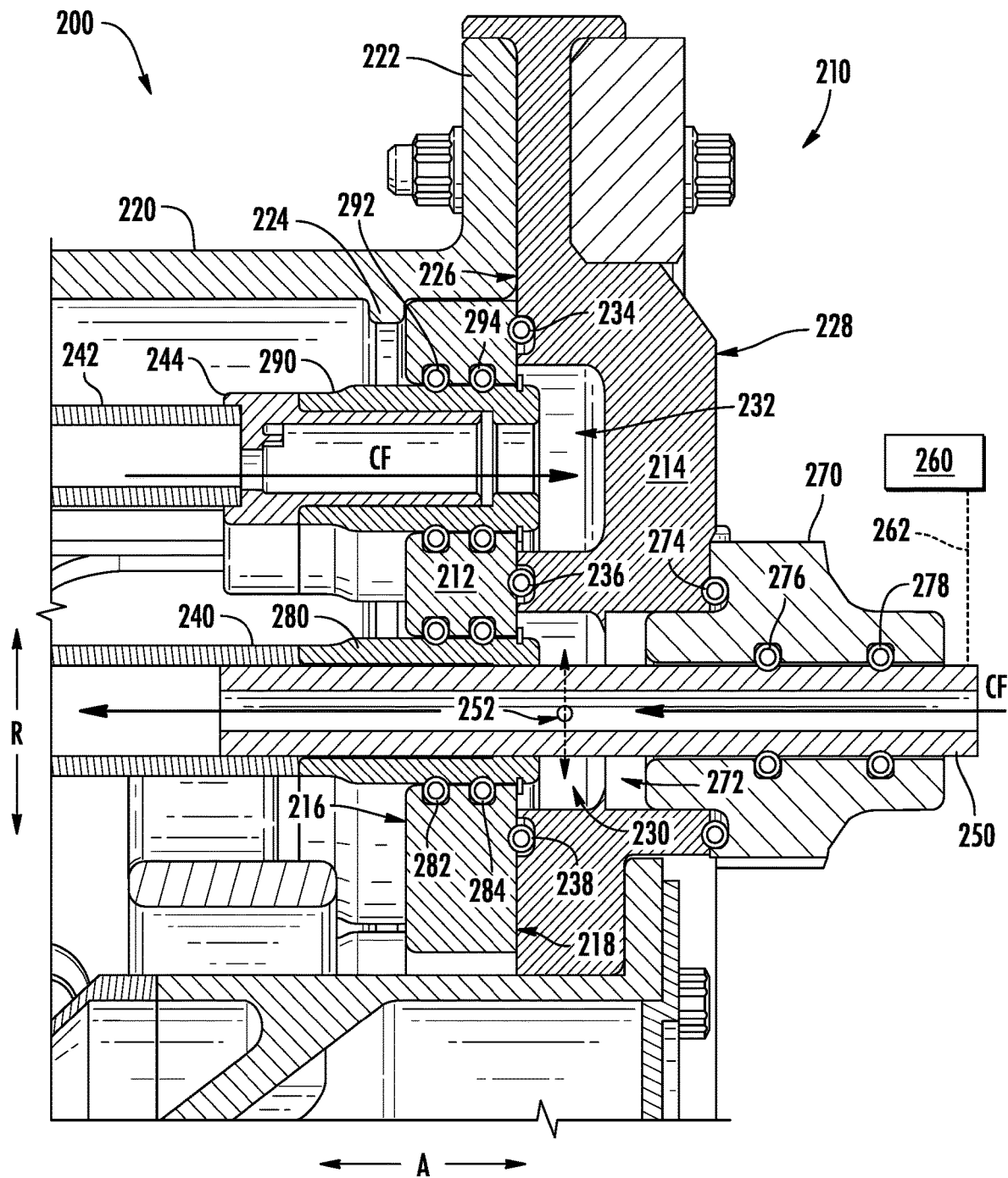
FIG. 4 provides a cross-sectional view of the manifold of FIG. 3.

FIGS. 3 and 4 provide various close-up views of a hybrid insulative-conductive manifold 210 of an electric machine 200 according to one example embodiment of the present disclosure. Particularly, FIG. 3 provides a perspective cross-sectional view of a portion of the manifold 210 and FIG. 4 provides a side cross-sectional view of a portion of the manifold 210. The manifold 210 is denoted herein as a hybrid insulative-conductive as it is constructed of both electrically insulative and electrically conductive components. The electrically conductive and insulative components of the manifold 210 are strategically arranged so that the insulative components electrically decouple or isolate the windings of the electric machine from one another despite each winding receiving cooling fluid provided or collected at the manifold 210, among other benefits. Moreover, although the manifold 210 is shown as a stator manifold in FIGS. 3 and 4, it will be appreciated that the inventive aspects disclosed herein may apply to rotor manifolds as well. In this regard, any of the manifolds 140, 150 of FIG. 2 can be configured in the same or similar manner as the manifold 210 of FIGS. 3 and 4.

As depicted, the manifold 210 includes an insulative plate 212 and a backplate 214. The insulative plate 212 is formed of an electrically insulative material. The insulative plate 212 can be formed of any suitable insulative or non-electrically conductive material. As one example, the insulative plate 212 can be formed of an insulative composite material. As another example, the insulative plate 212 can be formed of a ceramic material. As yet another example, the insulative plate 212 can be formed of a ceramic composite material. In some embodiments, the insulative plate 212 is formed of at least one of Torlon, a G11 material, a G10 material, and Acculam. In contrast, the backplate 214 is formed of an electrically conductive material. As one example, the backplate 214 can be formed of a suitable metallic material, such as aluminum.

The backplate 214 is positioned adjacent to the insulative plate 212, e.g., along the axial direction A. For this embodiment, the backplate 214 and the insulative plate 212 physically contact one another. Particularly, the insulative plate 212 has an inboard surface 216 and an outboard surface 218 spaced from the inboard surface 216 along the axial direction A. The inboard surface 216 and the outboard surface 218 both extend in a plane orthogonal to the axial direction A. The inboard surface 216 faces toward an interior of the electric machine 200 while the outboard surface 218 faces away from the interior of the electric machine 200. The interior of the electric machine 200 is circumferentially surrounding by a casing 220. The backplate 214 has an inboard surface 226 and an outboard surface 228 spaced from the inboard surface 226 along the axial direction A. The inboard surface 226 and the outboard surface 228 both extend in a plane orthogonal to the axial direction A. The inboard surface 226 faces toward an interior of the electric machine 200 while the outboard surface 228 faces away from the interior of the electric machine 200. As shown, the outboard surface 218 of the insulative plate 212 physically contacts the inboard surface 226 of the backplate 214.

A flange 222 of the casing 220 is secured to the backplate 214, e.g., at an outer periphery of the backplate 214. The casing 220 includes a tongue or projection 224 projecting inward along the radial direction R. The outer periphery of the insulative plate 212 is secured between the projection 224 and the backplate 214. Specifically, the inboard surface 216 of the insulative plate 212 engages the projection 224 while the outboard surface 218 of the insulative plate 212 engages the inboard surface 226 of the backplate 214 to sandwich the insulative plate 212 therebetween. The insulative plate 212 is also secured to the backplate 214 at its inner periphery, e.g., by a plurality of circumferentially-spaced bolts.

For this embodiment, both the insulative plate 212 and the backplate 214 are annular. However, in other embodiments, one or both of the insulative plate 212 and the backplate 214 need not be annular. For instance, in some embodiments, the insulative plate 212 can be segmented into at least at least two segments. The segments can extend circumferentially as shown in FIGS. 3 and 4, for example. In some embodiments, the insulative plate 212 can be segmented such that each prime winding of the electric machine 200 has a corresponding dedicated segment of the insulative plate 212. Further, in some embodiments, circumferential spaces can be defined between adjacent segments of the insulative plate 212. In this regard, components of the electric machine 200 can be strategically placed within the circumferential spaces. As one example, a circumferential space can be defined between adjacent segments of the insulative plate 212 at the six O'clock position with respect to the face of a clock. A sump or reservoir can be placed within the circumferential space, e.g., to capture cooling fluid sprayed on one or more bearings.

As further depicted in FIGS. 3 and 4, the manifold 210 defines channels operable to receive cooling fluid. Particularly, the insulative plate 212 and the backplate 214 define a first channel 230 therebetween. The insulative plate 212 and the backplate 214 also define a second channel 232 therebetween. For this embodiment, the first channel 230 is positioned inward of the second channel 232 along the radial direction R with respect to an axial centerline of the electric machine 200 (the axial centerline is not shown in FIGS. 3 and 4; but see FIG. 2). In this regard, the first channel 230 is an inner channel and the second channel 232 is an outer channel with respect to the axial centerline of the electric machine 200. For this embodiment, the first channel 230 and the second channel 232 are annular channels. However, in other embodiments, the first channel 230 and/or the second channel 232 may not extend annularly. For instance, in embodiments in which there is a space between segments of the insulative plate 212, the first channel 230 and the second channel 232 may not extend annularly. In this regard, in such embodiments, the first channel 230 may include multiple circumferential segments and the second channel 232 may include multiple circumferential segments.

The second channel 232 and the first channel 230 are fluidly separate or fluidly separated from one another so that cooling fluid is prevented from passing directly from the first channel 230 to the second channel 232 or vice versa. Indeed, as depicted, the manifold 210 includes an outer interface seal 234, a middle interface seal 236, and an inner interface seal 238. The middle interface seal 236 is positioned between the insulative plate 212 and the backplate 214, e.g., along the axial direction A, and is positioned inward of the second channel 232 and outward of the first channel 230 along the radial direction R. In this manner, cooling fluid is prevented from flowing directly between the first channel 230 and the second channel 232. The outer interface seal 234 is positioned between the insulative plate 212 and the backplate 214, e.g., along the axial direction A, and is positioned outward of the second channel 232 along the radial direction R. The outer interface seal 234 prevents cooling fluid from escaping radially outward from the second channel 232. The inner interface seal 238 is positioned between the insulative plate 212 and the backplate 214, e.g., along the axial direction A, and is positioned inward of the first channel 230 along the radial direction R. The inner interface seal 238 prevents cooling fluid from escaping radially inward from the first channel 230.

The electric machine 200 includes at least one prime winding and one or more secondary windings. For instance, for the depicted embodiment of FIGS. 3 and 4, the electric machine 200 includes prime winding 240 and secondary windings 242. The prime winding 240 and the secondary windings 242 are current-carrying members that are hollow for receiving cooling fluid. Thus, for this embodiment, the windings 240, 242 define the cooling circuits. The cooling fluid received within the windings 240, 242 provides cooling to the windings during operation of the electric machine 200.

Particularly, for this embodiment, the prime winding 240 is operable to receive a portion of the cooling fluid provided to the electric machine 200 and the other portion of the cooling fluid is provided to the first channel 230, as will be explained in further detail herein. The secondary windings 242 are in fluid communication with the first channel 230 and thus the secondary windings 242 receive cooling fluid flowing along the first channel 230. The cooling fluid flows through the prime winding 240 and the secondary windings 242 and eventually flows into the second channel 232. In this regard, the prime winding 240 and the secondary windings 242 are also in fluid communication with the second channel 232. The prime winding 240 and the secondary windings 242 fluidly connect the first channel 230 and the second channel 232. However, as noted above, cooling fluid is prevented from passing directly from the first channel 230 to the second channel 232 or vice versa. In this regard, the relatively cool cooling fluid within the first channel 230 does not mix with the relatively hot cooling fluid within the second channel 232.

As further depicted in FIGS. 3 and 4, the electric machine 200 includes one or more terminal conductors. For instance, the electric machine 200 includes terminal conductor 250. Generally, for this embodiment, the terminal conductor 250 functions as an electrical connection point or terminal of the electric machine 200 and also as a conduit that delivers or provides cooling fluid to the manifold 210, as shown by the arrow labeled CF in FIG. 4. As shown, the terminal conductor 250 extends through the backplate 214 and the insulative plate 212. Particularly, the terminal conductor 250 extends through an aperture defined by the backplate 214, through the first channel 230, and through an aperture defined by the insulative plate 212. In this regard, the apertures defined by the backplate 214 and the insulative plate 212 are aligned or in communication with one another and with the first channel 230. At least a portion of the terminal conductor 250 is positioned outboard of the electric machine 200 and at least a portion of the terminal conductor 250 is positioned inboard or within the interior of the electric machine 200.

As noted, the terminal conductor 250 functions as an electrical connection point of the electric machine 200. Accordingly, the terminal conductor 250 is formed of an electrically conductive material, such as copper. The terminal conductor 250 is electrically coupled with the prime winding 240. Particularly, as shown best in FIG. 4, an inboard portion of the electrically conductive terminal conductor 250 is in physical contact with the electrically conductive prime winding 240. Further, the terminal conductor 250, or more particularly an outboard portion thereof, is electrically coupled with an electrical system 260. The electrical system 260 can include one or more power sources, e.g., energy storage devices such as batteries, capacitors, etc., electrical devices such as inverters and converters, as well as other devices. A system terminal 262 can electrically connect the electrical system 260 with the terminal conductor 250 as shown best in FIG. 4. In FIG. 4, the system terminal 262 and the electrical system 260 are depicted schematically.

Accordingly, when the electric machine 200 in which the manifold 210 is incorporated acts as a motor, electrical power can be directed from a power source of the electrical system 260 to the system terminal 262, and as the system terminal 262 and the terminal conductor 250 are electrically coupled, the electrical power can be directed to the electric machine 200. In this manner, the terminal conductor 250 can be electrically coupled with a power source of the electrical system 260 and can be operable to carry electrical power received from the power source to the prime winding 240 electrically coupled with the terminal conductor 250. That is, electric current provided to the electric machine 200 can be carried to the prime winding 240 by the terminal conductor 250. Such electric current can also be used to excite the secondary windings 242 associated with the prime winding 240. The excited windings 240, 242 can ultimately cause a shaft of the electric machine 200 to rotate about its axis of rotation.

As another example, when the electric machine 200 in which the manifold 210 is incorporated acts as a generator, electrical power generated by the electric machine 200 can be directed to the terminal conductor 250, and as the terminal conductor 250 and the system terminal 262 are electrically coupled, the generated electrical power can be directed to the electrical system 260, e.g., to one or more energy storage devices thereof. That is, electric current can be passed from the prime winding 240 to the terminal conductor 250 and can ultimately be directed to one or more electrical loads or electric energy storage devices of the electrical system 260.

As noted above, the terminal conductor 250 also functions as a conduit to provide cooling fluid to the manifold 210. The terminal conductor 250 can be fluidly coupled with a coolant system that can provide or collect cooling fluid. For instance, an outboard end or portion of the terminal conductor 250 can be in fluid communication with a cooling loop, such as the cooling loop 132 of FIG. 2. For this embodiment, the terminal conductor 250 is a hollow tubular member. Thus, the terminal conductor 250 can receive cooling fluid and cooling fluid may flow through or along the terminal conductor 250.

For instance, for this embodiment, cooling fluid (e.g., oil) can flow from the coolant system, e.g., from the cooling loop 132, into the terminal conductor 250. In FIG. 4, cooling fluid CF received from a cooling loop is shown flowing downstream through the terminal conductor 250. The cooling fluid can flow along the terminal conductor 250 and a first portion of the cooling fluid can flow into the first channel 230 and a second portion of the cooling fluid can flow past the first channel 230 and into the prime winding 240 to provide cooling thereto.

More specifically, as shown best in FIG. 4, the terminal conductor 250 defines one or more openings through which cooling fluid flows between the terminal conductor 250 and the first channel 230. For instance, an opening 252 is shown defined by the terminal conductor 250. The terminal conductor 250 is positioned so that the opening 252 is in fluid communication with the first channel 230. In this way, the first portion of cooling fluid can flow from the terminal conductor 250 downstream through the opening 252 to the first channel 230, e.g., as shown by the dashed lines in FIG. 4. As noted above, the cooling fluid provided to the first channel 230 can then flow into other windings in fluid communication with the first channel 230, such as secondary winding 242 to provide cooling thereto. FIG. 3 shows one secondary winding 242 in fluid communication with the first channel 230 and operable to receive cooling fluid flowing along the first channel 230. It will be appreciated that many windings circumferentially spaced from one another can be in fluid communication or fluidly connected with the first channel 230 so that they may receive cooling fluid flowing along the first channel 230.

The terminal conductor 250 can define a plurality of openings. The openings can be offset from one another around the circumference or perimeter of the terminal conductor 250, e.g., by ninety degrees (90°). However, other opening spacing arrangements and/or configurations are possible. In some embodiments, for instance, the terminal conductor 250 can define at least four openings. In other embodiments, the terminal conductor 250 can define two openings opposed from one another, e.g., by one hundred eighty degrees (180°).

As further depicted in FIGS. 3 and 4, an outboard terminal sleeve 270 is fit over the terminal conductor 250 and is disposed between the terminal conductor 250 and the backplate 214. In this way, the terminal conductor 250 does not physically contact the backplate 214. The outboard terminal sleeve 270 is formed of an electrically insulative material, and thus, the outboard terminal sleeve 270 electrically isolates the terminal conductor 250 and the backplate 214. In this regard, the terminal conductor 250 is electrically isolated from the backplate 214. Moreover, a portion of the outboard terminal sleeve 270 is received within a counterbored recess 272 of the backplate 214. The counterbored recess 272 is in communication with the aperture defined by the backplate 214 through which the terminal conductor 250 extends.

One or more seals can be positioned between the outboard terminal sleeve 270 and the backplate 214. For instance, for this embodiment, an outboard sleeve seal 274 is positioned between the outboard terminal sleeve 270 and the backplate 214. More particularly, the outboard sleeve seal 274 is positioned within an annular groove defined by the outboard sleeve seal 274 and between the outboard terminal sleeve 270 and the outboard surface 228 of the backplate 214. In this example embodiment, the outboard sleeve seal 274 is an annular seal that extends around the outboard terminal sleeve 270 within the annular groove. Generally, the outboard sleeve seal 274 prevents cooling fluid from escaping between the outboard terminal sleeve 270 and the backplate 214.

In addition, one or more seals can be positioned between the terminal conductor 250 and the outboard terminal sleeve 270. For instance, for this embodiment, a first outboard terminal seal 276 and a second outboard terminal seal 278 are positioned between the terminal conductor 250 and the outboard terminal sleeve 270, e.g., within respective annular grooves defined by the outboard terminal sleeve 270. The first outboard terminal seal 276 and the second outboard terminal seal 278 are spaced from one another, e.g., along the axial direction A. The first outboard terminal seal 276 and the second outboard terminal seal 278 can both be annular seals, such as O-rings.

An inboard terminal sleeve 280 is fit over the terminal conductor 250 and is disposed between the terminal conductor 250 and the insulative plate 212. Accordingly, the aperture defined by the insulative plate 212 is sized to receive both the terminal conductor 250 and the inboard terminal sleeve 280 fit over the terminal conductor 250. The terminal conductor 250 does not physically contact the insulative plate 212. The inboard terminal sleeve 280 is formed of an electrically insulative material.

One or more seals can be positioned between the insulative plate 212 and the inboard terminal sleeve 280. For instance, for this embodiment, a first inboard terminal seal 282 and a second inboard terminal seal 284 are positioned between the insulative plate 212 and the inboard terminal sleeve 280, e.g., within respective annular grooves defined by the insulative plate 212. The first inboard terminal seal 282 and the second inboard terminal seal 284 are spaced from one another, e.g., along the axial direction A. The first inboard terminal seal 282 and the second inboard terminal seal 284 can both be annular seals, such as O-rings. Advantageously, the first inboard terminal seal 282 and the second inboard terminal seal 284 can prevent cooling fluid from escaping the first channel 230 and flowing into the interior of the electric machine 200.

As shown best in FIG. 4, a winding connector 244 is connected to the secondary winding 242 and is received within an aperture defined by the insulative plate 212. The winding connector 244 can be formed of an electrically conductive material. A plurality of secondary windings can be electrically connected to the winding connector 244. As depicted, a winding sleeve 290 is fit over the winding connector 244 and is disposed between the winding connector 244 and the insulative plate 212. Accordingly, the aperture defined by the insulative plate 212 is sized to receive both the winding connector 244 and the winding sleeve 290 fit over the winding connector 244. Neither the winding connector 244 nor the secondary winding 242 physically contact the insulative plate 212. One or more seals can be positioned between the insulative plate 212 and the winding sleeve 290. For instance, for this embodiment, a first winding seal 292 and a second winding seal 294 are positioned between the winding sleeve 290 and the insulative plate 212, e.g., within respective annular grooves defined by the insulative plate 212. The first winding seal 292 and the second winding seal 294 are spaced from one another, e.g., along the axial direction A. The first winding seal 292 and the second winding seal 294 can both be annular seals, such as O-rings. The first winding seal 292 and second winding seal 294 can prevent cooling fluid from escaping the second channel 232 and flowing into the interior of the electric machine 200.

It will be appreciated that each winding or set of windings, including the prime winding 240, can include a winding sleeve wrapped over the winding itself or a winding connector thereof at the interface with the insulative plate 212 and the second channel 232. For instance, the two secondary windings 242 shown in FIG. 3 can both include winding connectors 244 fit over by winding sleeves 290 at the interface of the insulative plate 212 and the second channel 232.

To summarize the cooling fluid flow through the cooling circuits of the electric machine 200, cooling fluid is moved along a cooling loop e.g., by a pump, during operation of the electric machine 200. The relatively cool cooling fluid is directed into the hollow terminal conductor 250. A first portion of the cooling fluid flowing along the terminal conductor 250 flows through the one or more openings 252 and into the first channel 230. The cooling fluid flows in a general circumferential direction through the first channel 230 and is distributed to circumferentially-spaced hollow windings of the electric machine 200. The cooling fluid flows into the windings, and as the cooling fluid flows therethrough, thermal energy or heat is imparted to the cooling fluid. This increases the temperature of the cooling fluid. Moreover, a second portion of the cooling fluid flowing along the terminal conductor 250 flows into the prime winding 240. The cooling fluid flows through the prime winding 240, and as the cooling fluid flows therethrough, thermal energy or heat is imparted to the cooling fluid. This increases the temperature of the cooling fluid flowing through the prime winding 240.

The cooling fluid flows through the windings 240, 242 wound through one or more end turns and eventually exits the hollow windings 240, 242 and flows into the second channel 232. The now relatively hot cooling fluid is collected in the second channel 232 and exits the second channel 232 through one or more exit ports defined by or that extend through the backplate 214. The cooling fluid can exit through the one or more outlet ports and can be cooled, e.g., by one or more heat exchangers, before being circulated back to the terminal conductor 250. Notably, as the manifold 210 includes strategically arranged insulative components, the current-carrying members or windings 240, 242 are electrically decoupled or isolated from one another despite receiving cooling fluid from a common source, among other benefits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

1. An electric machine, comprising: a manifold having an insulative plate formed of an electrically insulative material and a backplate positioned adjacent to the insulative plate and formed of an electrically conductive material; a winding; and a terminal conductor extending through the backplate and the insulative plate, the terminal conductor being electrically coupled with the winding and electrically isolated from the backplate, the terminal conductor also being in fluid communication with the winding so that cooling fluid can flow therebetween.

2. The electric machine of any preceding clause, wherein the insulative plate and the backplate define a first channel therebetween.

3. The electric machine of any preceding clause, wherein the terminal conductor extends through the first channel and defines one or more openings through which cooling fluid flows between the terminal conductor and the first channel.

4. The electric machine of any preceding clause, wherein the insulative plate and the backplate define a second channel therebetween, wherein the winding fluidly connects the first channel and the second channel.

5. The electric machine of any preceding clause, wherein the electric machine defines an axial direction, a radial direction, and an axial centerline extending therethrough along the axial direction, and wherein the first channel is positioned inward of the second channel along the radial direction with respect to the axial centerline.

6. The electric machine of any preceding clause, further comprising: a secondary winding electrically isolated from the winding and in fluid communication with the first channel and the second channel.

7. The electric machine of any preceding clause, further comprising: a winding connector connected to the secondary winding; and a winding sleeve fit over the winding connector and disposed between the winding connector and the insulative plate.

8. The electric machine of any preceding clause, further comprising: an outboard terminal sleeve fit over the terminal conductor and disposed between the terminal conductor and the backplate so that the terminal conductor does not physically contact the backplate.

9. The electric machine of any preceding clause, wherein the outboard terminal sleeve is formed of an electrically insulative material.

10. The electric machine of any preceding clause, further comprising: an inboard terminal sleeve fit over the terminal conductor and disposed between the terminal conductor and the insulative plate so that the terminal conductor does not physically contact the insulative plate.

11. The electric machine of any preceding clause, wherein the inboard terminal sleeve is formed of an electrically insulative material.

12. The electric machine of any preceding clause, wherein the insulative plate is annular.

13. The electric machine of any preceding clause, wherein the insulative plate is segmented into at least two segments.

14. The electric machine of any preceding clause, wherein the terminal conductor is a hollow tubular member.

15. An electric machine, comprising: a manifold having an insulative plate formed of an electrically insulative material and a backplate positioned adjacent to the insulative plate and formed of an electrically conductive material, the insulative plate and the backplate defining a first channel therebetween; a prime winding; a secondary winding electrically isolated from the prime winding and in fluid communication with the first channel; and a terminal conductor extending through the backplate and the insulative plate, the terminal conductor being electrically coupled with the prime winding and electrically isolated from the backplate, the terminal conductor also being in fluid communication with the first channel so that cooling fluid can flow therebetween.

16. The electric machine of any preceding clause, wherein the terminal conductor is in fluid communication with the prime winding.

17. The electric machine of any preceding clause, wherein the insulative plate and the backplate define a second channel therebetween, and wherein the prime winding and the secondary winding are both in fluid communication with the second channel.

18. The electric machine of any preceding clause, wherein the terminal conductor extends through the first channel and defines one or more openings through which cooling fluid flows between the terminal conductor and the first channel.

19. The electric machine of any preceding clause, further comprising: an outboard terminal sleeve fit over the terminal conductor and disposed between the terminal conductor and the backplate so that the terminal conductor does not physically contact the backplate, the outboard terminal sleeve being formed of an electrically insulative material; and an inboard terminal sleeve fit over the terminal conductor and disposed between the terminal conductor and the insulative plate so that the terminal conductor does not physically contact the insulative plate, the inboard terminal sleeve being formed of an electrically insulative material.

20. An electric machine, comprising: a manifold having an insulative plate formed of an electrically insulative material and a backplate positioned adjacent to the insulative plate and formed of an electrically conductive material, the insulative plate and the backplate defining a first channel therebetween and a second channel therebetween; a prime winding; a secondary winding electrically isolated from the prime winding, the secondary winding being in fluid communication with the first channel and the second channel; a terminal conductor extending through the backplate and the insulative plate and electrically coupled with the prime winding, the terminal conductor being in fluid communication with the first channel and the prime winding so that cooling fluid flows between the terminal conductor and the prime winding and between the terminal conductor and the first channel; an outboard terminal sleeve fit over the terminal conductor and disposed between the terminal conductor and the backplate; and an inboard terminal sleeve fit over the terminal conductor and disposed between the terminal conductor and the insulative plate.

What is claimed is:
1. An electric machine, comprising:
a manifold having an insulative plate formed of an electrically insulative material and a backplate positioned adjacent to the insulative plate and formed of an electrically conductive material, wherein the insulative plate and the backplate define a first channel and a second channel therebetween, and wherein the insulative plate is segmented into at least two segments along a circumferential direction;
a winding; and
a terminal conductor extending through the backplate and the insulative plate, the terminal conductor being electrically coupled with the winding and electrically isolated from the backplate, the terminal conductor also being in fluid communication with the winding so that cooling fluid can flow therebetween.

2. The electric machine of claim 1, wherein the terminal conductor extends through the first channel and defines one or more openings through which cooling fluid flows between the terminal conductor and the first channel.

3. The electric machine of claim 1, wherein the winding fluidly connects the first channel and the second channel.

4. The electric machine of claim 3, wherein the electric machine defines an axial direction, a radial direction, and an axial centerline extending therethrough along the axial direction, and wherein the first channel is positioned inward of the second channel along the radial direction with respect to the axial centerline.

5. The electric machine of claim 3, further comprising:
a secondary winding electrically isolated from the winding and in fluid communication with the first channel and the second channel.

6. The electric machine of claim 5, further comprising:
a winding connector connected to the secondary winding; and
a winding sleeve fit over the winding connector and disposed between the winding connector and the insulative plate.

7. The electric machine of claim 1, further comprising:
an outboard terminal sleeve fit over the terminal conductor and disposed between the terminal conductor and the backplate so that the terminal conductor does not physically contact the backplate; and
one or more seals positioned between the outboard terminal sleeve and the backplate.

8. The electric machine of claim 7, wherein the outboard terminal sleeve is formed of an electrically insulative material.

9. The electric machine of claim 7, further comprising:
an inboard terminal sleeve fit over the terminal conductor and disposed between the terminal conductor and the insulative plate so that the terminal conductor does not physically contact the insulative plate, wherein the inboard terminal sleeve is separate from the outboard terminal sleeve; and
one or more seals positioned between the inboard terminal sleeve and the insulative plate.

10. The electric machine of claim 9, wherein the inboard terminal sleeve is formed of an electrically insulative material.

11. The electric machine of claim 1, wherein the insulative plate is annular.

12. The electric machine of claim 1, wherein the terminal conductor is a hollow tubular member.

13. An electric machine, comprising:
a manifold having an insulative plate formed of an electrically insulative material and a backplate positioned adjacent to the insulative plate and formed of an electrically conductive material, the insulative plate and the backplate defining a first channel and a second channel therebetween, and wherein the insulative plate is segmented into at least two segments along a circumferential direction;
a prime winding;
a secondary winding electrically isolated from the prime winding and in fluid communication with the first channel; and
a terminal conductor extending through the backplate and the insulative plate, the terminal conductor being electrically coupled with the prime winding and electrically isolated from the backplate, the terminal conductor also being in fluid communication with the first channel so that cooling fluid can flow therebetween.

14. The electric machine of claim 13, wherein the terminal conductor is in fluid communication with the prime winding.

15. The electric machine of claim 13, wherein the prime winding and the secondary winding are both in fluid communication with the second channel.

16. The electric machine of claim 13, wherein the terminal conductor extends through the first channel and defines one or more openings through which cooling fluid flows between the terminal conductor and the first channel.

17. The electric machine of claim 13, further comprising:
an outboard terminal sleeve fit over the terminal conductor and disposed between the terminal conductor and the backplate so that the terminal conductor does not physically contact the backplate, the outboard terminal sleeve being formed of an electrically insulative material; and
an inboard terminal sleeve fit over the terminal conductor and disposed between the terminal conductor and the insulative plate so that the terminal conductor does not physically contact the insulative plate, the inboard terminal sleeve being formed of an electrically insulative material.

18. An electric machine, comprising:
a manifold having an insulative plate formed of an electrically insulative material and a backplate positioned adjacent to the insulative plate and formed of an electrically conductive material, the insulative plate and the backplate defining a first channel therebetween and a second channel therebetween, and wherein the insulative plate is segmented into at least two segments along a circumferential direction;
a prime winding;
a secondary winding electrically isolated from the prime winding, the secondary winding being in fluid communication with the first channel and the second channel;
a terminal conductor extending through the backplate and the insulative plate and electrically coupled with the prime winding, the terminal conductor being in fluid communication with the first channel and the prime winding so that cooling fluid flows between the terminal conductor and the prime winding and between the terminal conductor and the first channel;
an outboard terminal sleeve fit over the terminal conductor and disposed between the terminal conductor and the backplate; and
an inboard terminal sleeve fit over the terminal conductor and disposed between the terminal conductor and the insulative plate.

* * * * *